Sept. 2, 1924.  1,506,854

H. C. MOULTON

BLINDSTITCH FELLING MACHINE

Filed March 4, 1922  4 Sheets-Sheet 1

Inventor.
Harley C. Moulton
by Heard Smith & Tennant
Attys.

Sept. 2, 1924.

H. C. MOULTON

BLINDSTITCH FELLING MACHINE

Filed March 4, 1922

Inventor.
Harley C. Moulton
by Heard Smith & Tennant
Attys.

Sept. 2, 1924.
H. C. MOULTON
BLINDSTITCH FELLING MACHINE
Filed March 4, 1922     4 Sheets-Sheet 3
1,506,854
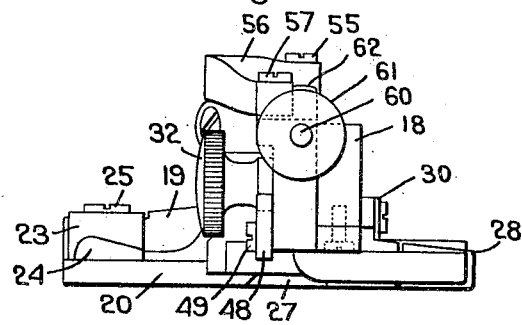
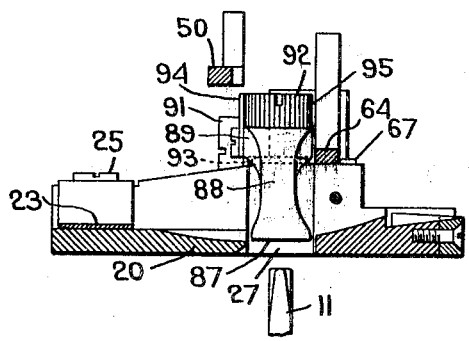
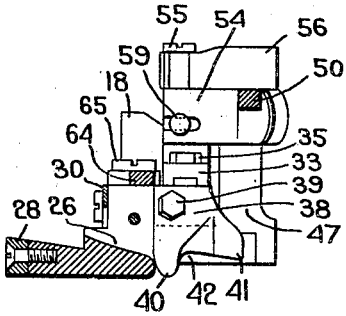
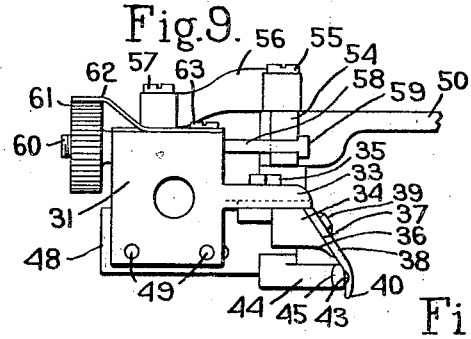
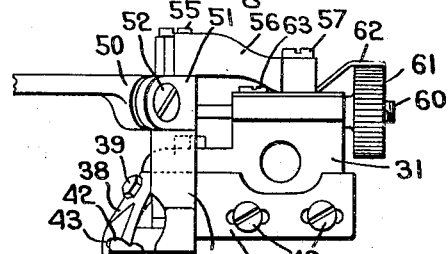
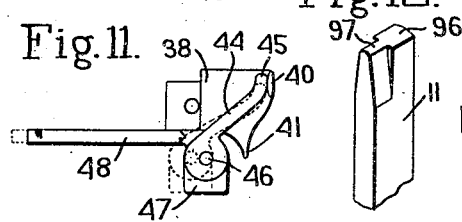
Inventor
Harley C. Moulton
by Heard Smith & Tennant.
Attys.

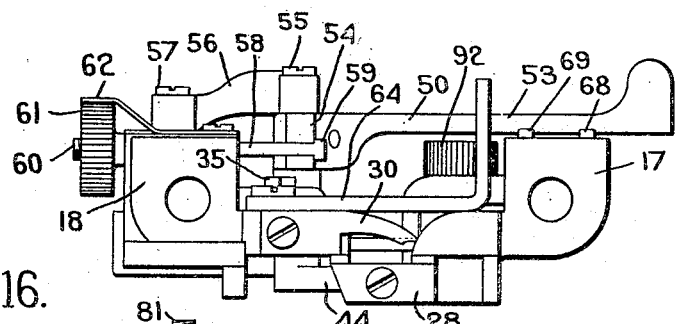
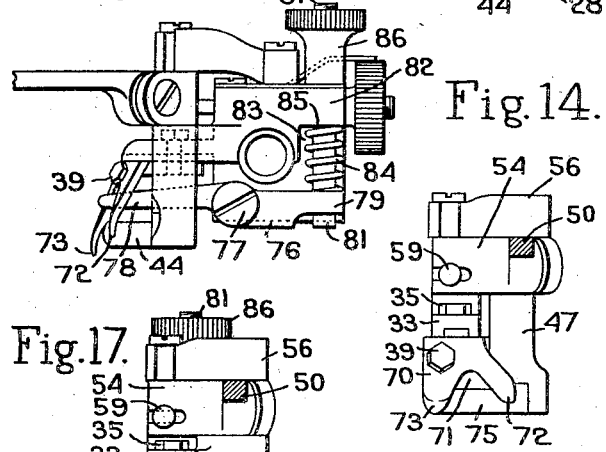
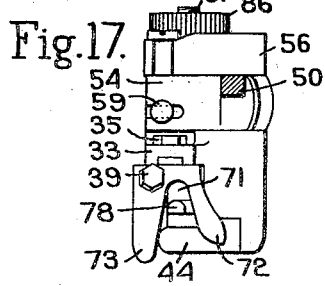
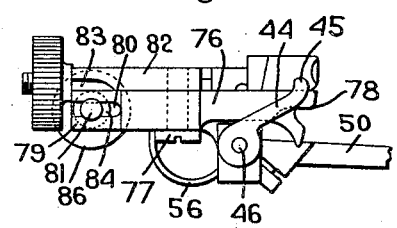
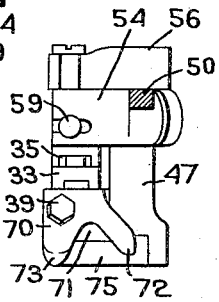
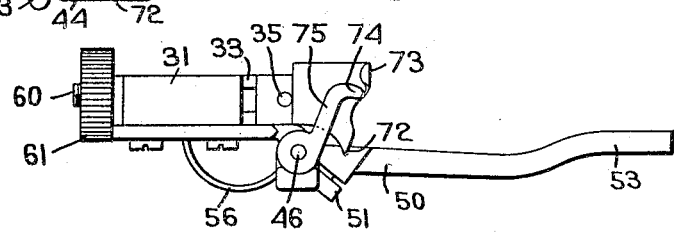

Patented Sept. 2, 1924.

1,506,854

UNITED STATES PATENT OFFICE.

HARLEY C. MOULTON, OF DORCHESTER, MASSACHUSETTS, ASSIGNOR, BY MESNE ASSIGNMENTS, TO ARBETTER FELLING MACHINE CO., OF BOSTON, MASSACHUSETTS.

BLINDSTITCH FELLING MACHINE.

Application filed March 4, 1922. Serial No. 541,220.

*To all whom it may concern:*

Be it known that I, HARLEY C. MOULTON, a citizen of the United States, and resident of Dorchester, county of Suffolk, State of Massachusetts, have invented an Improvement in Blindstitch Felling Machines, of which the following description, in connection with the accompanying drawing, is a specification, like characters on the drawing representing like parts.

This invention relates to improvements in work presenting mechanism for felling a superimposed layer upon a base layer of material and the principal object of the invention is to provide a work presenting mechanism which will enable the under face of the superimposed layer to be stitched to the base layer at a considerable distance from the edge of the superimposed layer as is required in felling the edges of coat linings and similar articles to the body of the garment.

A further object of the invention is broadly to provide a work presenting mechanism of this character which will satisfactorily operate upon widely different thicknesses and character of materials employed for the superimposed layer.

A further object of the invention is to provide a work presenting mechanism which can be so adjusted as to present a predetermined amount of the superimposed layer into the path of the needle irrespective of the thickness or character of the superimposed layer and thus to avoid the difficulty heretofore experienced in stitching through more than a single thickness of the superimposed layer when thin material is used, or an insufficient amount of the superimposed layer when a relatively thick material is employed.

A further object of the invention is to provide a combined guide and bender mechanism for the superimposed layer which will continuously co-operate to position the turned-up edge portion of the superimposed layer in one of the paths of reciprocation of the needle. This desirably is accomplished by providing a recessed guide which preferably is inclined to the plane of the work support and which crosses the path of the needle and a preferably yieldable bender which acts normally to force the under face of the superimposed layer at a distance from the edge thereof against the guide adjacent to the stitching point.

Further objects of the invention are respectively to provide novel means for adjusting the guide and the bender.

A further object of the invention is to provide an adjustable gauge for the turned-up edge of the superimposed layer which may be positioned to cause the stitches in the superimposed layer to lie at a predetermined distance from the edge thereof.

A further object of the invention is to provide means for so supporting the guide and bender mechanism that it can be readily removed from operative position to enable inspection of the work at the stitching point.

Another object of the invention is to provide means for removing the bender for the superimposed layer from its operative position and retaining the same out of operative position during the insertion of the work.

Another object of the invention is to provide a machine for felling a superimposed layer upon a base layer of material which employs a reciprocating lower bender for presenting the upper surface of the base layer into the path of the needle, with preferably adjustable means for limiting the upward movement of the bender so that the same depth of stitch may be taken in the base layer irrespective of the thickness of the goods of said layer.

Another object of the invention is to provide a novel gauge for the edge of the superimposed layer.

Other objects and features of the invention will more fully appear from the following description and the annexed drawings and will be pointed out in the claims.

The preferred embodiment of my invention which is illustrated herein is particularly designed to be employed in connection with the type of sewing machine illustrated in my prior application Serial Number 332,025, filed October 20, 1919. This type of machine comprises a bed plate having an overhanging arm terminating in a head which carries mechanism for reciprocating and laterally vibrating a curved needle, and also embodies complemental stitch forming mechanism which co-operates with the needle. The feeding mechanism is also mounted upon the head of the sewing machine and operates upon the upper surfaces of the base and superimposed layers. The presser foot which is disclosed in my aforesaid application is rigidly secured to the head, or rather to the hook bracket which forms a part thereof, and the work is clamped against the presser foot by a spring actuated work support which is depressed by the action of the feed mechanism when the work is advanced, but which, under the influence of the spring, clamps the work against the presser foot during the return movement of the feeding mechanism. A lower bender is provided, as is usual in machines of this type, to thrust the base layer intermittently upwardly into one of the paths of reciprocation of the needle.

The present invention is particularly addressed to improvements in the mechanism which presents the base and superimposed layers to the needle and particularly to that mechanism which manipulates the edge portion of the superimposed layer. Inasmuch, therefore, as the present improvements are adapted for employment with the type of machine disclosed in the aforesaid applications, only such portion of the sewing machine as a whole is illustrated herein as is required to show the association of the present invention therewith.

In the drawings:

Fig. 6 is a side elevation of the same viewed from the right toward the left, Fig. 4;

Fig. 7 is a sectional view in a vertical plane on the line x—x, Fig. 4, looking toward the left;

Fig. 8 is a vertical sectional view in the same plane looking toward the right;

Fig. 9 is a detail elevation of the block and the guide and bender carried thereby, viewed from the rear;

Fig. 10 is a similar view of the block, guide and bender viewed from the front;

Fig. 11 is a detail view upon a larger scale showing the pivotally mounted bender and the adjustable bracket by which it is carried;

Fig. 12 is a detail perspective view of the upper portion of the preferred form of bender;

Fig. 13 is an elevation of the presser foot viewed from the rear;

Figure 1:
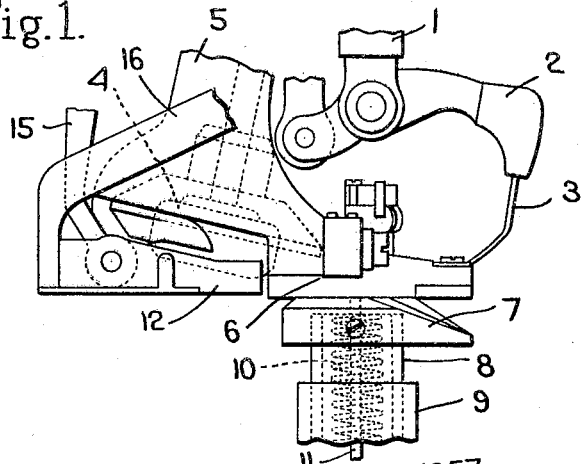
Fig. 1 is an elevation of a portion of the needle mechanism and complemental stitch forming mechanism, feeding mechanism and work support and bender of the machine of the type disclosed in my prior application aforesaid.
Figure 2:
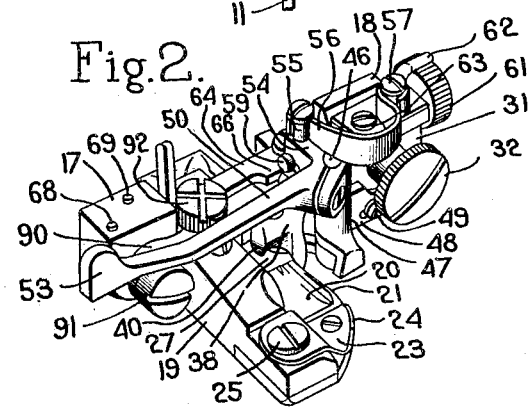
Fig. 2 is a perspective view of the novel form of presser foot which comprises the principal features of the work presenting mechanism of this invention.

Fig. 14 it a detail elevation of a slightly modified form of recessed guide for the edge of the superimposed layer more especially designed for sewing a piped edge of a superimposed layer to a base layer and the associated mechanisms;

Fig. 15 is a detail bottom plan view of the guide and associated mechanisms illustrated in Fig. 14 shown in combination with a slightly different form of bender;

Fig. 16 is a detail front elevation of the guide and bender mechanism for the superimposed layer, showing also an adjustable gauge for the edge of the superimposed layer;

Fig. 17 is a detail side elevation of the guide, bender and gauge illustrated in Fig. 16; and, Fig. 18 is a detail plan view showing the guide, bender and gauge illustrated in Fig. 16.

The general structure of the preferred form of blind stitch sewing machine, to which the present invention is applied, is of the type above briefly described and more fully disclosed in my copending application Serial Number 332,025, above identified, in which the needle bar supporting member 1, which carries the needle bar 2 having a curved needle 3, is pivotally supported upon the upper portion of the head of the machine and is actuated by a suitable mechanism to reciprocate the needle in the general direction of the line of feed, and preferably to vibrate the needle in such a manner that alternate stitches are made in the base and superimposed layers, said layers being respectively presented in the paths of the needle by suitable mechanism. The complemental stitch forming mechanism is in the form of a hook 4 carried by the usual hook bracket 5 depending from the sewing machine head. The presser foot 6 is rigidly secured to the hook bracket and co-operates with a work support 7 which is carried by a standard 8 telescopically mounted in a sleeve 9 and normally sustained in clamping relation to the work support by a helical spring 10. A bender 11, mounted and operating in a manner disclosed in the aforesaid application, serves to present the base layer intermittently in one of the paths of reciprocation of the needle, a suitable spring being interposed between the bender and its actuating mechanism in order to permit the bender to yield when base layers of different thicknesses are operated upon and when seams and other additional thicknesses of fabric pass the stitching point.

The feeding mechanism comprises preferably a horseshoe shaped feed bar 12 having feed dogs which operate in suitable ways 13 and 14 in the lower portion of the presser foot. The feed bar is given its reciprocating movement through a lever 15 which is pivotally connected to the feed bar and oscillated preferably from a take-up mechanism of the machine as more fully disclosed in my prior application, and the feed dog is given its vertical oscillating movement through an arm 16 rigidly secured to the feed bar and operated from the needle actuating mechanism as more fully appears in my prior application aforesaid.

In the operation of the machine the work is inserted between the work support and presser foot and is clamped by the work support against the presser foot. After a stitch has been formed in the base or superimposed layer the feed bar is oscillated downwardly in such a manner as to cause the feed dogs to depress the work support out of clamping relation to the presser foot. The feed dog is then given a longitudinal feeding movement which advances the work a distance of one stitch. The feed bar is then oscillated in the other direction to release its engagement with the work and bring the work support again into clamping relation to the presser foot during the formation of the next stitch and the feed bar is then reciprocated longitudinally into position to again grasp and feed the work for another stitch. Such mechanism may be, and preferably is, constructed as described in my prior application above identified, but it will be understood that other types of feeding mechanism may be employed in connection with the present invention.

The work presenting mechanism to which the present invention relates pertains more particularly to the presser foot and associated mechanisms for guiding the edge portion of the superimposed layer in such a manner as to present the under face of the turned-up edge portion of said superimposed layer in the path of the needle at the stitching point, this mechanism being particularly designed and constructed so to present the under face of the superimposed layer in the path of the needle that the needle will penerate a predetermined distance into the layer irrespective of the variations in thickness of the layer. This preferably is accomplished by providing a recessed guide which crosses the path of the needle and engages the under face of the turned-up portion of the superimposed layer and guides the same both fore and aft of the stitching point. In co-operation with this guide a preferably yieldable bender is provided which forces the under face of the superimposed layer against said guide so that the penetration of the needle into the superimposed layer is at all times uniform. The guide desirably is so disposed as to form a stop against which the goods are pressed by the bender and preferably is made adjustable so that a desired depth of penetration in the superimposed layer may be obtained.

Desirably this bender and the mechanism by which it is supported are adjustable for the purpose hereinafter to be more fully set forth. Means are also provided for removing the bender and guiding mechanism from their normal position to permit inspection of the work and removal of threads or other material which may accumulate at or near the stitching point. The preferred form of presser foot which is illustrated in the drawing comprises a body or heel portion having upwardly extending ears 17 and 18 which are adapted to be connected to the hook bracket 5 which depends from the head of the sewing machine. A toe portion 19 extends forwardly from the body or heel portion and desirably is provided with a laterally extending shelf 20 provided at its edge with a flange 21 forming a guide for the needle. This lateral extension may be more conveniently made in the form of a separate plate secured to the recessed under face of the toe portion by screws 22. Desirably an additional guide 23, having an upwardly extending flange 24 which curves rearwardly, is secured to the recessed upper front end portion of the toe by a screw 25.

The heel portion of the presser foot is provided with a central recessed portion presenting a curved upper face substantially of the same curvature and forming a guide 26 for the needle at the rear of the throat or recess 27 which lies intermediate of the extension 20 and recessed heel portion.

A plate 28, having upwardly extending flanges, encloses the rearwardly extending end 29 of the body portion and forms a seat to receive the tongue upon the bobbin.

A curved thread guard 30 desirably is connected to the body of the presser foot and extends over the recessed heel portion of the presser foot and serves to insure proper engagement of the loop of needle thread with the rotary hook of the complemental stitch forming mechanism.

The guide and bender desirably are pivotally mounted upon a block which itself is pivotally mounted upon the ear 18 of the presser foot. In the preferred construction illustrated herein a rectangular block 31 is pivotally mounted upon a screw or bolt 32 which passes through the ear 18 and secures said ear of the presser foot to the hook bracket. This rectangular block is provided with a lateral extension 33 to the under face of which a block 34 is adjustably secured by a machine screw 35 passing through a suitable slot in the extension 33 and engaging the block 34. The under face of the block 34 is provided with a curved surface 36 which guides and limits the upward movement of the turned-up edge of the superimposed layer. Where the superimposed layer is in the form of an inturned lining this curved surface serves to form an abutment for the looped portion of the lining and to somewhat spread the loop. It also determines the extent to which the loop extends above the face of the base layer.

The block 34 is provided with a beveled face 37 which lies toward the line of stitching, but preferably is in a plane oblique both to the direction of the line of stitching and to the plane of the work support. The guide 38 for the turned-up edge of the superimposed layer is secured to this block by a machine screw 39.

The guide 38 is provided with a downwardly extending edge portion which is bifurcated and presents end portions 40 and 41 with a recess 42 therebetween to permit the passage of the needle and such portion of the superimposed layer as is forced into the path of the needle by the bender. When in normal guiding position the end portion 41 of this guide desirably rests upon the rear end of the guiding flange 21 upon the presser foot extension 20, and the rear extension 40 of said guide lies upon the other side of the path of the needle. Desirably this downwardly extending portion 40 is provided with a needle groove 43 and the needle in passing through this groove engages lightly against the bottom thereof if no fabric is being presented to it.

By adjusting the block 34 in the manner above described the end portions 40 and 41 of the guide may be properly positioned in respect to the path of the needle.

Figure 5:
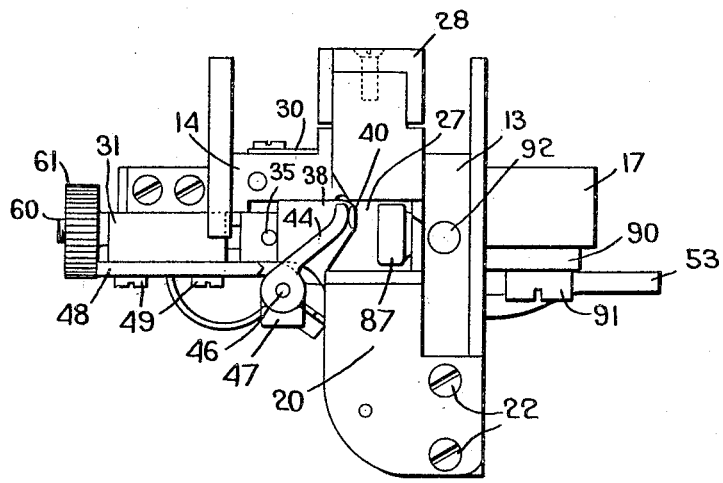
Fig. 5 is an underneath plan view of the same.

The means for forcing the goods into the path of the needle as illustrated herein comprises a bender 44 in the form of an arm, the end portion 45 of which co-operates with the guide 38 to present the turned-up portion of the superimposed layer in the path of the needle. The end portion 45 of this guide, when used for felling, desirably is placed in juxtaposition to, and opposite, the downward extension 40 of the guide 38 (Figs. 5 and 11), whereas in stitching piping upon a superimposed layer slightly different forms of guides, such as are illustrated in Figs. 15 to 18, may be employed which engage the fabric in front of the downwardly extending portion 40 of the guide 38.

Figure 3:
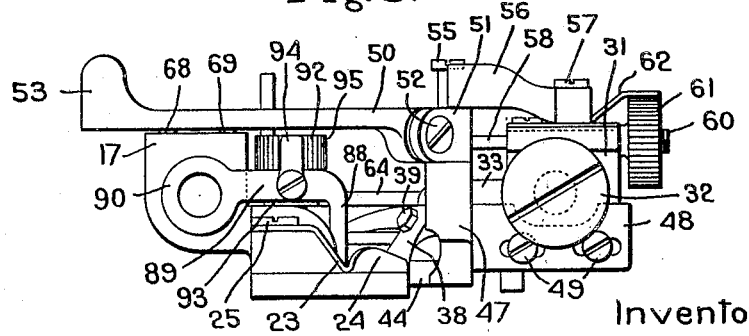
Fig. 3 is a front elevation of the presser foot shown in Fig. 2.

The bender arm 44 is connected to a vertical rock shaft 46 which is mounted in a boss 47 of a bracket 48 which is attached by slot and screw connections 49 to the square block 31 which is pivoted upon the ear 18 of the presser foot. A lever 50, having a split elbow portion 51, is clamped upon the upper end of the rock shaft 46 by a screw 52 (Fig. 3) and is provided with an arm 53 extending across the presser foot and with a rearwardly extending arm 54 through which yieldable means act to hold the bender yieldably in engagement with the superimposed layer and thereby force the same against the rear portion 40 of the guide 38.

Figure 4:
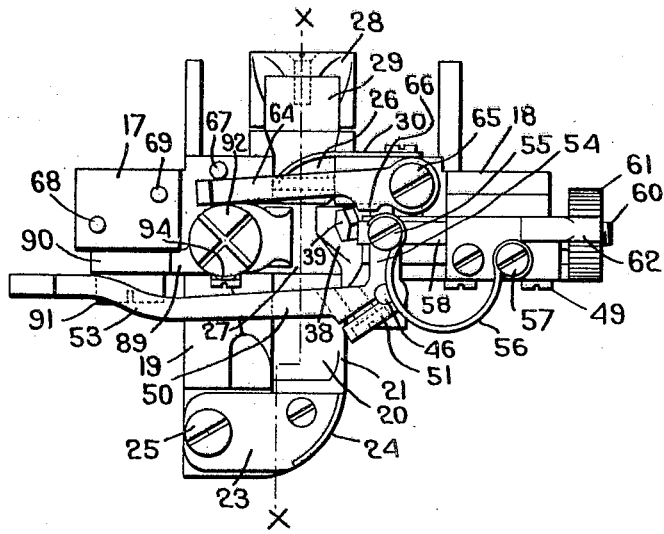
Fig. 4 is a top plan view of the same.

As illustrated herein (particularly in Fig. 4) a stud 55 is seated in the end portion of the lever arm 54 and is engaged by a curved spring 56 which is anchored at its opposite end upon a stud 57 which is seated in the block 31. A suitable stop is provided to limit the movement of the lever arm 54. As illustrated, particularly in Fig. 13 this stop comprises a bar 58 having a head 59 which engages the inner face of the lever arm 54 and extends through said lever arm and through the upper portion of the block 31 and is provided with a screw threaded end 60 which is engaged by a screw 61 having a ratchet head, the hub of which screw abuts upon the outer face of said block. A pawl or keeper 62 is provided to engage the ratchet upon the head 61, this keeper preferably being an upwardly bent portion of a tempered plate, which plate is secured to the upper edge of the block by a screw 63 and also by the screw 57 upon which the end of the spring 56 is anchored.

It will be obvious that the action of the spring 56 upon the lever arm 54 tends to swing the same toward the line of stitching and inasmuch as the bender 44 extends in the same direction this spring holds its end portion 45 against or adjacent to the downward extension 40 of the guiding member so that when the needle is reciprocated its point will pass between the end portion of the bender 45 and the guide 40, and, after the point has passed therebetween the needle itself will be engaged preferably lightly by the guide and bender. By reason of this construction a uniform penetration of the needle in the under face of the superimposed layer will be provided when the superimposed layer is forced against the guide 40 by the bender. Thus uniformity of penetration of the needle into the superimposed layer is at all times insured.

It is desirable that means shall be provided for removing the guide and bender mechanism from normal position in order to permit inspection of the work at the stitching point and permit the manipulation of the superimposed layer and also to permit the removal of threads which may accumulate at this point, which otherwise is inaccessible. In order to accomplish this purpose suitable means are provided for locking the guide and bender in normal position, so constructed that when unlocked the block which carries the bender and guide may be rotated about its pivot by the extending lever arm 53 which is connected to the rock shaft 46. The preferred mechanism for locking the bender in normal position comprises a locking lever 64 which is pivotally mounted upon a stud or screw 65 seated in the heel portion of the presser foot and provided with an extension 66 which overlies the extension 33 of the block 31, (see Fig. 4). The arm of the lever 64 extends across the cut-away heel portion of the presser foot and is adapted to engage a stud 67 which projects up a short distance from the body portion of the presser foot. When the guide and bender are in normal position the lever is thrown into locking position, illustrated in Fig. 4, and is retained therein by the stud 67.

It is sometimes desirable to remove the bender 44 from its operative position in respect to the downward extension 40 of the guide 38. This is accomplished by providing a stud 68 which extends upwardly from the upper face of the ear 17 of the presser foot a short distance so that the lever 53 may be hooked over the stud 68. Obviously, the movement of the lever arm 53 into this position will swing the bender away from its work engaging position as this lever arm is on the opposite side of the rock shaft 46 from that of the arm 54 and the bender 44.

An additional stud 69 desirably extends upwardly from the upper face of the ear 17 and limits the rearward movement of the arm 53 so that injury to the mechanism by a careless workman may be avoided.

It will thus be seen that the bender may be moved away from the guide by the arm 53 as above stated. It will also be noted that the normal position of the bender may be adjusted by the adjustment of the stop 59 which engages the rearwardly extending arm 54 of the bender. By this means the bender may be set to operate upon any desired thickness of material.

It will also be observed that the bender mechanism may be adjusted bodily by the adjustment of the bracket 48 which is permitted by the bolt and slot connections 49. This adjustment of the bracket 48 causes in effect an adjustment of the bender longitudinally of the line of stitching and also laterally thereof as illustrated in Fig. 11 which shows the bracket in one normal position in full lines, and in an adjusted position in dotted lines. This movement longitudinally and laterally of the line of stitching is due to the fact that the bender is pivotally mounted upon its rock shaft 46 and is constantly under the action of the spring 56 which tends to rotate the bender 44 about the axis of the rock shaft. The longitudinal and lateral movement of the bender in such cases resulting from the adjustment of the bracket adapts the bender properly to the character of the goods for which the device is adjusted.

A modified form of mechanism is illustrated in Figs. 14 and 15 which is particularly designed to adapt the work presenting mechanism herein described for use in blind stitching the piped edge of a superimposed layer upon a base layer of material.

The general construction of the device illustrated in Figs. 14 and 15 is the same as that illustrated in Figs. 1 to 13 inclusive, except that the guide 70, which corresponds to the guide 38, is provided with a deeper recess 71. The forward extension 72 is adapted to rest upon the guide 21 of the needle plate 20 and the rearward extension 73 is located upon the opposite side of the needle as heretofore described.

The bender mechanism as shown in Figs. 14 and 15 is identical with that previously described, except that the end portion 74 of the bender 75 is bent in the opposite direction and is located slightly forward of the rearward extension 73 of the guide 70, in order that the bender may effectively bend the piped edge sufficiently to present the under face thereof in the path of the needle, as the piped edge is much stiffer than usual linings which are manipulated by felling machines. Otherwise, the action of the mechanism illustrated in these figures is identical with that heretofore described.

A further feature of the invention consists in providing an adjustable gauge for the edge of the superimposed layer by means of which the line of stitching in the superimposed layer may be located at a predetermined distance from the edge thereof. A preferred form of gauge which is illustrated in Figs. 16, 17 and 18 comprises a lever 76 which is pivotally mounted upon a stud 77 which is seated in the lower portion of the block 31, one arm 78 of said lever extending across the path of the turned-up edge of the superimposed layer and desirably projecting through the recess 71 in the guide 72. The arm 78, therefore, constitutes a gauge which overlies the path of the needle and limits the upward movement of the turned-up edge portion of the superimposed layer. By reason of the construction above described the turned-up edge of the superimposed layer is practically enclosed by the guide, bender and gauge adjacent the stitching point, so that the stitch is laid with extreme accuracy by the needle, which passes between these members.

Suitable means are provided for engaging the other arm 79 of the lever 76 to retain the same in adjusted position. As illustrated herein the end portion of the arm 79 is provided with a slot 80 which receives a flattened portion of a screw threaded rod 81 which extends upwardly through the upper portion 82 of the block 31. A portion 83 of the block 31 is cut away and a helical spring 84 is interposed between the upper shoulder 85 of the cut-away portion of the block and the top of the lever arm 79. This spring tends normally to depress the arm 79 and, therefore, to elevate the gauge arm 78. A nut 86, which engages the upper screw threaded end portion of the rod 81 and rests upon the top of the block 31, may be adjusted in opposition to the spring to depress the gauge to any desired position.

By suitably adjusting the gauge 78 a desired width of the up-turned portion of the superimposed layer or piped edge thereof may be provided so that the line of stitching in the superimposed layer will be made at a predetermined definite distance from the edge thereof.

A further feature of the invention consists in providing means, located above the work support, for limiting the upward movement of the lower bender in such a manner that a predetermined depth of stitching will be made in the base layer irrespective of the thickness of the goods of said base layer.

In the preferred embodiment of the invention illustrated herein, (see particularly Figs. 2, 3 and 7), a stop or abutment is provided which is preferably L-shape in form, the lower face 87 of one arm 88 being positioned directly above a portion of the bender 11. The other arm 89 of the abutment extends across the toe portion of the presser foot and is provided with an enlarged annular end 90 which is pivotally mounted upon a stud 91 by which the ear 17 of the presser foot is secured to the hook bracket. An adjusting screw 92, having a slotted top, passes through the arm 88 of the L-shaped stop member and is seated in the toe portion 19 of the presser foot. A spring washer 93, which desirably is interposed between the top of the toe portion of the presser foot and the under face of the arm 89, tends normally to raise the stop arm 88, but by adjusting the screw 92 the face 87 of the stop arm 88 may be located at any desired distance above the plane of the under face of the presser foot. A pawl or keeper 94 may be provided to engage the toothed periphery 95 of the screw 92 and hold the same in adjusted position.

By reason of this construction it will be obvious that the face 87 of the stop may be located at any desired distance above the path of the needle so that only a predetermined thickness of the base layer will be presented in the path of the needle irrespective of the thickness of the base layer as the bender 11 will have to yield when the goods are forced against the face 87 of the stop.

Preferably the upper portion of the bender 11 is provided with a flat work engaging face 96, as illustrated in Fig. 12, which is located directly beneath the stop and a relatively narrow portion 97 which extends beneath the path of the needle in its penetrating stroke into the base layer.

By reason of this construction a uniform depth of the thrust of the needle into the base layer will be maintained irrespective of the thickness or thicknesses of the layer or layers of the base layer, or the seams therein; consequently, the machine is adapted to stitch across pockets in coats without sewing together the sides of the pockets and is also adapted to do other work which has heretofore been found impracticable in sewing machines of this type.

While the work presenting mechanism is described herein as applied to a blind stitch sewing machine in which the needle is given an oscillatory, and also a vibratory, movement to form rows of stitches respectively in the base and superimposed layers, the same mechanism may be employed in connection with a blind stitch sewing machine in which the base and superimposed layers are stitched together by a single line of stitching, it being necessary to adjust the bender and the abutment or stop laterally sufficiently to cause the bender to rise within the recess of the guide which crosses the path of the needle so that the bender will raise the base layer into the path of the needle in advance of the portion of the superimposed layer which is deflected by the yieldable upper bender into the path of the needle so that the needle will pass first through the upper surface of the base layer and upon emergence therefrom will enter and emerge from the under face of the superimposed layer.

It will be understood that the embodiment of the invention disclosed herein is of an illustrative character and that various modifications may be made in form, construction and arrangement of parts within the spirit and scope of the following claims.

Having thus described my invention, what I claim as new, and desire to secure by Letters Patent, is:

1. In a blind stitch sewing machine for felling a superimposed layer upon a base layer of material comprising a work support, a reciprocating needle and complemental stitch forming mechanism; work presenting mechanism including means for turning up the edge portion of the superimposed layer away from the base layer, and guiding said turned-up portion adjacent to the path of reciprocation of the needle, a bender located above the work support engaging said superimposed layer at a distance from the edge thereof, adjacent the stitching point, and acting continuously to deflect said turned-up portion of the superimposed layer into the path of the needle at the stitching point.

2. In a blind stitch sewing machine for felling a superimposed layer upon a base layer of material comprising a work support, a reciprocating needle and complemental stitch forming mechanism; work presenting mechanism including means for turning up the edge portion of the superimposed layer away from the base layer, and guiding said turned-up portion adjacent to one of the paths of reciprocation of the needle, a pivotally mounted bender, located above the work support in substantial parallelism therewith, engaging said superimposed layer at a distance from the edge thereof adjacent the stitching point, acting continuously to deflect the turned-up portion of the superimposed layer into the path of the needle at the stitching point and means for adjusting said bender.

3. In a blind stitch sewing machine for felling a superimposed layer upon a base layer of material comprising a work suport, a reciprocating and laterally vibrating needle and complemental stitch forming mechanism; work presenting mechanism including means for turning up the edge portion of the superimposed layer away from the base layer, and guiding said turned-up portion adjacent to one of the paths of reciprocation of the needle, a bender engaging said superimposed layer at a distance from the edge thereof adjacent the stitching point, acting continuously to deflect the turn-up portion of the superimposed layer into the path of the needle at the stitching point and means for adjusting said bender simultaneously in the direction of the line of stitching and also transversely thereof.

4. In a blind stitch sewing machine for felling a superimposed layer upon a base layer of material comprising a work support, a reciprocating and laterally vibrating needle and complemental stitch forming mechanism; work presenting mechanism including means for turning up the edge portion of the superimposed layer away from the base layer, and guiding said turned-up portion adjacent to one of the paths of reciprocation of the needle, a bender engaging said superimposed layer at a distance from the edge thereof, adjacent the stitching point, and acting continuously to deflect said turned-up portion of the superimposed layer into the path of the needle at the stitching point and means for removing said bender from work-engaging position.

5. A blind stitch sewing machine for felling a superimposed layer upon a base layer of material comprising a work support, a needle reciprocable in the general direction of the line of stitching, and complemental stitch forming mechanism; work presenting mechanism comprising a recessed guide for the edge of the superimposed layer obliquely crossing the path of the needle adjacent to the stitching point, acting to turn up the edge portion of said superimposed layer and a bender co-operating with said guide acting to deflect the turned-up portion of said superimposed layer into the path of the needle at the stitching point.

6. A blind stitch sewing machine for felling a superimposed layer upon a base layer of material comprising a work support, a needle reciprocable in the general direction of the line of stitching, and complemental stitch forming mechanism; work presenting mechanism comprising a recessed guide for the edge of the superimposed layer obliquely crossing the path of the needle adjacent to the stitching point, acting to turn up the edge portion of said superimposed layer and a gauge co-operating with said guide to limit the width of the turned-up edge portion of the superimposed layer and a bender co-operating with said guide acting to deflect the turned-up portion of said superimposed layer into the path of the needle at the stitching point.

7. A blind stitch sewing machine for felling a superimposed layer upon a base layer of maerial comprising a work support, a needle reciprocable in the general direction of the line of stitching, and complemental stitch forming mechanism; work presenting mechanism comprising a recessed guide for the edge of the superimposed layer obliquely crossing the path of the needle adjacent to the stitching point, acting to turn up the edge portion of said superimposed layer, an adjustable gauge co-operating with said guide to limit the width of the turned-up edge portion of the superimposed layer and a yieldable bender co-operating with said guide acting to deflect the turned-up portion of the superimposed layer into the path of the needle at the stitching point.

8. A blind stitch sewing machine for felling a superimposed layer upon a base layer of material comprising a work support, a needle reciprocable in the general direction of the line of stitching, and complemental stitch forming mechanism; work presenting mechanism comprising a recessed guide for the edge of the superimposed layer, crossing the path of the needle, acting to turn up the edge portion of said superimposed layer, an adjustable gauge comprising a lever having an arm extending into the recess in said guide, means for adjusting the other arm of said lever and a bender co-operating with said guide acting to deflect the turned-up portion of said superimposed layer into the path of the needle at the stitching point.

9. A blind stitch sewing machine for felling a superimposed layer upon a base layer of material comprising a work support, a needle reciprocable in the general direction of the line of stitching, means for laterally vibrating said needle and complemental stitch forming mechanism; work presenting mechanism comprising a recessed guide for the edge of the superimposed layer obliquely crossing said path of the needle adjacent to the stitching point, acting to turn up the edge portion of said superimposed layer and a spring actuated bender acting to force the turned-up portion of the superimposed layer against said guide adjacent the stitching point and means for adjusting said bender.

10. A blind stitch sewing machine for felling a superimposed layer upon a base layer of material comprising a work support, a needle reciprocable in the general direction of the line of stitching, means for laterally vibrating said needle and complemental stitch forming mechanism; work presenting mechanism comprising a recessed guide for the edge of the superimposed layer obliquely crossing said path of the needle adjacent to the stitching point acting to turn up the edge portion of said superimposed layer, a spring actuated bender acting to force the turned-up portion of the superimposed layer against said guide adjacent the stitching point and means pivotally supporting said guide and bender operable to permit the same to be removed from operative position to permit access to the work at the stitching point.

11. A blind stitch sewing machine for felling a superimposed layer upon a base layer of material comprising a work support, a needle reciprocable in the general direction of the line of stitching, means for laterally vibrating said needle and complemental stitch forming mechanism; work presenting mechanism comprising a recessed guide for the edge of the superimposed layer, crossing said path of the needle, acting to turn up the edge portion of said superimposed layer, a bender pivotally mounted upon an axis substantially perpendicular to the plane of the work support having a free end acting to force the turned-up portion of the superimposed layer against said guide adjacent the stitching point and means for rotarily adjusting said bender about the axis of its pivotal support.

12. A blind stitch sewing machine for felling a superimposed layer upon a base layer of material comprising a work support, a needle reciprocable in the general direction of the line of stitching, means for laterally vibrating said needle and complemental stitch forming mechanism; work presenting mechanism comprising a recessed guide for the edge of the superimposed layer, crossing said path of the needle, acting to turn up the edge portion of said superimposed layer, a spring actuated bender pivotally mounted upon an axis substantially perpendicular to the plane of the work support having a free end acting to force the turned-up portion of the superimposed layer against said guide adjacent the stitching point and means for rotarily adjusting said bender about its pivotal axis comprising a screw threaded stop member operable to limit the approaching movement of said bender toward said guide.

13. A blind stitch sewing machine for felling a superimposed layer upon a base layer of material comprising a work support, a needle reciprocable in the general direction of the line of stitching, and complemental stitch forming mechanism; work presenting mechanism comprising a recessed guide for the edge of the superimposed layer, crossing said path of the needle, acting to turn up the edge portion of said superimposed layer, a spring actuated bender pivotally mounted upon an axis substantially perpendicular to the plane of the work support having a free end acting to force the superimposed layer against said guide adjacent the stitching point and an arm for rotating said bender about its axis to remove it from engagement with said superimposed layer.

14. A blind stitch sewing machine for felling a superimposed layer upon a base layer of material comprising a work support, a needle reciprocable in the general direction of the line of stitching, and complemental stitch forming mechanism; work presenting mechanism comprising a recessed guide for the edge of the superimposed layer, crossing said path of the needle, acting to turn up the edge portion of said superimposed layer, a spring actuated bender pivotally mounted upon an axis substantially perpendicular to the plane of the work support having a free end acting to force the superimposed layer against said guide adjacent the stitching point, means for rotarily adjusting said bender about its pivotal axis and means for bodily adjusting the pivotal support of said bender toward and from the path of the needle.

15. In a blind stitch sewing machine comprising a work support, a reciprocating needle and a complemental stitch forming mechanism located above said work support, work presenting mechanism comprising a bender operable to present the under face of the turned-up portion of the superimposed layer in the path of reciprocation of the needle, a lower bender operable to engage the lower surface of the base layer and to present the upper surface thereof in the path of the needle and means, located above the base layer, operable to limit the upward movement of said lower bender whereby the stitch taken in the base layer will be uniform irrespective of the thickness of said layer.

16. In a blind stitch sewing machine comprising a work support, a reciprocating and laterally vibrating needle and complemental stitch forming mechanism located above said work support, work presenting mechanism comprising a bender operable to present the under face of the turned-up portion of the superimposed layer in one of the paths of reciprocation of the needle, a lower bender operable to engage the lower surface of the base layer and to present the upper surface thereof in the other path of the needle, means, located above the base layer, operable to limit the upward movement of said lower bender whereby the stitch taken in the base layer will be uniform irrespective of the thickness of said layer and means for adjusting the position of the means for limiting the upward movement of the lower bender.

17. In a blind stitch sewing machine comprising a work support, a reciprocating and laterally vibrating needle and complemental stitch forming mechanism located on the same side of the work support; work presenting mechanism comprising means for turning up the edge portion of the superimposed layer away from the base layer adjacent to one of the paths of reciprocation of said needle, a bender acting continuously to deflect the turned-up portion of the superimposed layer into said path of the needle at the stitching point, a lower bender engaging the under face of the base layer, acting to present the upper surface of said base layer into the other path of reciprocation of the needle and means, located above said base layer, for limiting the upward movement of said bender.

18. A presser foot for a blind stitch sewing machine for felling a superimposed layer upon a base layer of material comprising a toe and a heel portion with a needle throat therebetween, a recessed guide positioned to cross the path of the needle obliquely adjacent to the stitching point and adapted to turn up the edge portion of the superimposed layer as it passes the stitching point and a yieldable bender acting continuously to force the turned-up edge portion of the superimposed layer toward said guide adjacent the stitching point.

19. A presser foot for a blind stitch sewing machine for felling a superimposed layer upon a base layer of material comprising a toe and a heel portion with a needle throat therebetween, a recessed guide positioned to cross the path of the needle obliquely adjacent to the stitching point and adapted to turn up the edge portion of the superimposed layer as it passes the stitching point, a rearwardly extending bender having a free end positioned to engage the turned-up edge portion of the superimposed layer at a distance back from the edge thereof, a pivotal support for said bender and resilient means acting upon the pivotal support for said bender to cause the free end of the bender continuously to force the turned-up portion of the superimposed layer against said guide.

20. A presser foot for a blind stitch sewing machine for felling a superimposed layer upon a base layer of material comprising a toe and a heel portion with a needle throat therebetween, a recessed guide positioned to cross the path of the needle obliquely adjacent to the stitching point and adapted to turn up the edge portion of the superimposed layer as it passes the stitching point, a rearwardly extending bender having a free end positioned to engage the turned-up edge portion of the superimposed layer at a distance from the edge thereof, a pivotal support for said bender, resilient means acting upon the pivotal support for said bender to cause the free end of the bender continuously to force the turned-up portion of the superimposed layer against said guide and an adjustable stop for limiting the pivotal movement of said bender toward said guide.

21. A presser foot for a blind stitch sewing machine for felling a superimposed layer upon a base layer of material comprising a toe and a heel portion with a needle throat therebetween, a recessed guide positioned to cross the path of the needle adapted to turn up the edge portion of the superimposed layer as it passes the stitching point, a rearwardly extending bender having a free end positioned to engage the turned-up edge portion of the superimposed layer at a distance from the edge thereof, a pivotal support for said bender, resilient means acting upon the pivotal support for said bender to cause the free end of the bender to force the turned-up portion of the superimposed layer against said guide, an adjustable stop for limiting the pivotal movement of said bender toward said guide and means for bodily adjusting the pivotal support for said bender toward and from said guide whereby the passage for the superimposed layer between the bender support and guide may be varied.

22. A presser foot for a blind stitch sewing machine for felling a superimposed layer upon a base layer of material comprising a toe and a heel portion with a needle throat therebetween, a block pivotally mounted upon said presser foot having a recessed guide for the edge portion of the superimposed layer crossing the path of the needle, a bracket mounted on said block, a rock shaft mounted in said bracket having at its lower end a rearwardly extending bender, the free end of which is positioned to co-operate with said guide adjacent the stitching point, an arm upon the upper end of said rock shaft, resilient means engaging said arm acting to force the free end of said bender toward said guide and means for locking said block to position said guide and bender in operative relation to the path of the needle.

23. A presser foot for a blind stitch sewing machine for felling a superimposed layer upon a base layer of material comprising a toe and a heel portion with a needle throat therebetween, a block pivotally mounted upon said presser foot having a recessed guide for the edge portion of the superimposed layer crossing the path of the needle, a bracket mounted on said block, a rock shaft mounted in said bracket having at its lower end a rearwardly extending bender, the free end of which is positioned to co-operate with said guide adjacent the stitching point, an arm upon the upper end of said rock shaft, resilient means engaging said arm acting to force the free end of said bender toward said guide, means for locking said block to position said guide and bender in operative relation to the path of the needle and an adjustable stop mounted in said block operable to limit the movement of said bender toward said guide.

24. A presser foot for a blind stitch sewing machine for felling a superimposed layer upon a base layer of material comprising a toe and a heel portion with a needle throat therebetween, a block pivotally mounted upon said presser foot having a recessed guide for the edge portion of the superimposed layer crossing the path of the needle, a bracket mounted on said block, a rock shaft mounted in said bracket having at its lower end a rearwardly extending bender the free end of which is positioned to co-operate with said guide adjacent the stitching point, an arm upon the upper end of said rock shaft, resilient means engaging said arm acting to force the free end of said bender toward said guide, means for adjusting said bracket toward and from the path of the needle and means for locking said block to position said guide and bender in operative relation to the path of the needle.

25. A presser foot for a blind stitch sewing machine for felling a superimposed layer upon a base layer of material comprising a toe and a heel portion with a needle throat therebetween, a block pivotally mounted upon said presser foot having a recessed guide for the edge portion of the superimposed layer crossing the path of the needle, a bracket mounted on said block, a rock shaft mounted in said bracket having at its lower end a rearwardly extending bender, the free end of which is positioned to co-operate with said guide beyond the stitching point, an arm upon the upper end of said rock shaft, resilient means engaging said arm acting to force the free end of said bender toward said guide, means for locking said block to position said guide and bender in operative relation to the path of the needle and a handle connected to said rock shaft operable to remove the free end of said bender from said guide and means adapted to engage said handle to retain the bender in said removed position to permit ready insertion of the work.

26. A presser foot for a blind stitch sewing machine for felling a superimposed layer upon a base layer of material comprising a toe and a heel portion with a needle throat therebetween, a block pivotally mounted upon said presser foot having a recessed guide for the edge portion of the superimposed layer crossing the path of the needle, means for adjusting said guide transversely of the path of the needle, a bracket mounted on said block, a rock shaft mounted in said bracket having at its lower end a rearwardly extending bender, the free end of which is positioned to co-operate with said guide adjacent the stitching point, an arm upon the upper end of said rock shaft, resilient means engaging said arm acting to force the free end of said bender toward said guide and means for locking said block to position said guide and bender in operative relation to the path of the needle.

27. A presser foot for a blind stitch sewing machine for felling a superimposed layer upon a base layer of material comprising a toe and a heel portion with a needle throat therebetween, a block pivotally mounted upon said presser foot having a recessed guide for the edge portion of the superimposed layer, crossing the path of the needle, and provided with means for limiting the extent to which the edge of the superimposed layer may be turned up, a bracket mounted on said block, a rock shaft mounted in said bracket having at its lower end a rearwardly extending bender, the free end of which is positioned to co-operate with said guide adjacent the stitching point, an arm upon the upper end of said rock shaft, resilient means engaging said arm acting to force the free end of said bender toward said guide and means for locking said block to position said guide and bender in operative relation to the path of the needle.

28. A presser foot for a blind stitch sewing machine for felling a superimposed layer upon a base layer of material comprising a toe and a heel portion with a needle throat therebetween, a recessed guide positioned to cross the path of the needle obliquely adjacent to the stitching point and adapted to turn up the edge portion of the superimposed layer as it passes the stitching point, a bender acting to force the turned-up edge portion of the superimposed layer toward said guide adjacent the stitching point and a gauge located above the path of the needle positioned to engage the edge of the superimposed layer acting to limit the width of said turned-up edge portion.

29. A presser foot for a blind stitch sewing machine for felling a superimposed layer upon a base layer of material comprising a toe and a heel portion with a needle throat therebetween, a recessed guide positioned to cross the path of the needle obliquely adjacent to the stitching point and adapted to turn up the edge portion of the superimposed layer as it passes the stitching point, a bender acting to force the turned-up edge portion of the superimposed layer toward said guide adjacent the stitching point, a substantially horizontal gauge positioned to engage the edge of the superimposed layer acting to limit the width of said turned-up edge portion and means for adjusting said gauge.

30. A presser foot for a blind stitch sewing machine for felling a superimposed layer upon a base layer of material comprising a toe and a heel portion with a needle throat therebetween, a recessed guide positioned to cross the path of the needle adapted to turn up the edge portion of the superimposed layer as it passes the stitching point, a bender acting to force the turned-up edge portion of the superimposed layer toward said guide adjacent the stitching point, a gauge adapted to engage the edge of the turned-up portion of the superimposed layer comprising a lever having an arm extending across the path of said edge and means for adjusting the other arm of said lever.

31. A presser foot for a blind stitch sewing machine for felling a superimposed layer upon a base layer of material comprising a toe and a heel portion with a needle throat therebetween, a recessed guide positioned to cross the path of the needle adapted to turn up the edge portion of the superimposed layer as it passes the stitching point, a bender acting to force the turned-up edge portion of the superimposed layer toward said guide adjacent the stitching point, a gauge adapted to engage the edge of the turned-up portion of the superimposed layer comprising a lever having an arm extending across the path of said edge and means for adjusting the other arm of said lever comprising a screw threaded member extending through the latter arm and a nut seated upon a relatively stationary member engaging said screw threaded member.

32. A presser foot for a blind stitch sewing machine for felling a superimposed layer upon a base layer of material comprising a guide operable to turn up the edge portion of the superimposed layer, means co-operating with said guide to force the under face of the turned-up edge portion of the superimposed layer into the path of the needle and a stop mounted on said presser foot operable to limit the upward movement of the bender which thrusts the base layer into the path of the needle.

33. A presser foot for a blind stitch sewing machine for felling a superimposed layer upon a base layer of material comprising a guide operable to turn up the edge portion of the superimposed layer, means co-operating with said guide to force the under face of the turned-up edge portion of the superimposed layer into the path of the needle, a stop having a laterally extending arm pivotally mounted on said presser foot and means acting upon said arm to adjust the position thereof.

34. A presser foot for a blind stitch sewing machine for felling a superimposed layer upon a base layer of material comprising a guide operable to turn up the edge portion of the superimposed layer, means co-operating with said guide to force the under face of the turned-up edge portion of the superimposed layer into the path of the needle, a stop having a laterally extending arm pivotally mounted on said presser foot and means acting upon said arm to adjust the position thereof comprising resilient means beneath said arm tending to raise the same and a screw passing through said arm, seated in said presser foot, and means for securing said screw in adjusted position.

35. A presser foot for a blind stitch sewing machine for stitching a superimposed layer upon a base layer of material comprising co-operating guide, bender and gauge mechanisms enclosing the needle path adapted respectively continuously to engage the opposite sides and edge of the turned-up edge portion of a superimposed layer adjacent the stitching point.

36. A presser foot for a blind stitch sewing machine for stitching a superimposed layer upon a base layer of material comprising co-operating guide, bender and gauge mechanisms enclosing the needle path adapted respectively continuously to engage the opposite sides and edge of the turned-up edge portion of a superimposed layer adjacent the stitching point, and independent means for adjusting respectively said gauge, bender and guide.

37. A presser foot for a blind stitch sewing machine for stitching the edge portion of a superimposed layer upon a base layer of material comprising means for turning up the edged portion of the superimposed layer and presenting the underface thereof in the path of the needle and an adjustable gauge overlying the path of the needle above the stitching point.

In testimony whereof, I have signed my name to this specification.

HARLEY C. MOULTON.